(12) United States Patent
Prasad et al.

(10) Patent No.: US 8,359,576 B2
(45) Date of Patent: Jan. 22, 2013

(54) USING SYMBOLIC EXECUTION TO CHECK GLOBAL TEMPORAL REQUIREMENTS IN AN APPLICATION

(75) Inventors: Mukul R. Prasad, San Jose, CA (US);
Indradeep Ghosh, San Jose, CA (US);
Sreeranga P. Rajan, Sunnyvale, CA (US)

(73) Assignee: Fujitsu Limited, Kawasaki-Shi (JP)

( * ) Notice: Subject to any disclaimer, the term of this patent is extended or adjusted under 35 U.S.C. 154(b) by 1104 days.

(21) Appl. No.: 12/271,651

(22) Filed: Nov. 14, 2008

(65) Prior Publication Data

US 2010/0125832 A1  May 20, 2010

(51) Int. Cl.
  *G06F 9/44* (2006.01)
(52) U.S. Cl. .......... 717/124; 717/126; 717/131
(58) Field of Classification Search .......... None
  See application file for complete search history.

(56) References Cited

U.S. PATENT DOCUMENTS

| | | | |
|---|---|---|---|
| 6,324,496 B1* | 11/2001 | Alur et al. | 703/17 |
| 6,415,369 B1* | 7/2002 | Chodnekar et al. | 711/158 |
| 6,698,012 B1* | 2/2004 | Kossatchev et al. | 717/126 |
| 7,082,599 B1* | 7/2006 | Morganelli et al. | 717/131 |
| 7,587,636 B2* | 9/2009 | Tillmann et al. | 714/33 |
| 7,653,520 B2* | 1/2010 | De Moura et al. | 703/2 |
| 7,668,796 B2* | 2/2010 | Hinchey et al. | 706/48 |
| 7,711,525 B2* | 5/2010 | Ganai et al. | 703/2 |
| 7,797,687 B2* | 9/2010 | Tillmann et al. | 717/131 |
| 7,890,484 B1* | 2/2011 | Hall | 707/705 |
| 7,926,025 B2* | 4/2011 | Campbell et al. | 717/104 |
| 7,970,601 B2* | 6/2011 | Burmester et al. | 704/9 |
| 8,122,436 B2* | 2/2012 | Costa et al. | 717/124 |
| 2003/0110474 A1* | 6/2003 | Ur et al. | 717/131 |
| 2006/0010428 A1* | 1/2006 | Rushby et al. | 717/124 |
| 2007/0168971 A1* | 7/2007 | Royzen et al. | 717/124 |
| 2008/0082968 A1* | 4/2008 | Chang et al. | 717/124 |
| 2009/0089759 A1* | 4/2009 | Rajan et al. | 717/126 |
| 2009/0125976 A1* | 5/2009 | Wassermann et al. | 726/1 |
| 2009/0235235 A1* | 9/2009 | Prasad et al. | 717/126 |
| 2010/0125832 A1* | 5/2010 | Prasad et al. | 717/124 |

(Continued)

OTHER PUBLICATIONS

Wang, et al., "Symbolic Execution of Behavioral Requirements", 2004 Springer-Verlag; [retrieved on Jan. 17, 2012]; Retrieved from Internet <URL: http://www.springerlink.com/content/6h1u9u1bveq8r3ft/fulltext.pdf>; pp. 178-192.*

(Continued)

*Primary Examiner* — Thuy Dao
*Assistant Examiner* — Xi D Chen
(74) *Attorney, Agent, or Firm* — Baker Botts L.L.P.

(57) ABSTRACT

In one embodiment, a method include accessing one or more global temporal requirements of an application specified using one or more requirement templates from a library of requirement templates, accessing a model of the application, generating one or more symbolic expressions of one or more of the global temporal requirements of the application, searching a state space of the application model with a model checker, monitoring the search of the state space for events in the state space encompassed by the symbolic expressions and modifying construction of a graph of the state space in response to occurrence of one or more events encompassed by the symbolic expressions, evaluating the symbolic expressions based on the graph of the state space to determine whether one or more of the global temporal requirements are valid, and communicating one or more results of the evaluation of the symbolic expressions for presentation to a user.

19 Claims, 9 Drawing Sheets

U.S. PATENT DOCUMENTS

| | | | |
|---|---|---|---|
| 2010/0281469 A1* | 11/2010 | Wang et al. | 717/131 |
| 2010/0299651 A1* | 11/2010 | Fainekos et al. | 717/126 |
| 2011/0016356 A1* | 1/2011 | Artzi et al. | 717/131 |
| 2011/0016456 A1* | 1/2011 | Artzi et al. | 717/131 |
| 2011/0016457 A1* | 1/2011 | Artzi et al. | 717/131 |
| 2011/0078666 A1* | 3/2011 | Altekar | 717/131 |
| 2011/0225568 A1* | 9/2011 | Rajan et al. | 717/126 |
| 2011/0258606 A1* | 10/2011 | Vechev et al. | 717/126 |
| 2012/0011489 A1* | 1/2012 | Murthy et al. | 717/126 |
| 2012/0017200 A1* | 1/2012 | Ghosh et al. | 717/126 |
| 2012/0017201 A1* | 1/2012 | Rajan et al. | 717/124 |
| 2012/0084759 A1* | 4/2012 | Candea et al. | 717/126 |

OTHER PUBLICATIONS

Visser, et al., "Test Input Generation with Java PathFinder", 2004 ACM; [retrieved on Jan. 17, 2012]; Retrieved from Internet <URL: http://dl.acm.org/citation.cfm?id=1007526>; pp. 97-107.*

Bultan, et al., "Model-Checking Concurrent Systems with Unbounded Integer Variables: Symbolic Representations, Approximations, and Experimental Results", 1999 ACM; [retrieved on Jan. 19, 2012]; Retrieved from Internet <URL: http://dl.acm.org/citation.cfm?id=325480>; pp. 747-789.*

Holzmann and Smith, "Software model checking: extracting verification models from source code", 2001 Software Testing, Verification and Reliability Journal; [retrieved on Jan. 20, 2012]; Retrieved from Internet <URL: http://onlinelibrary.wiley.com/doi/10.1002/stvr.228/pdf>; pp. 65-79.*

Boyer, et al., "SELECT—A Formal System for Testing and Debuggging Programs by Symbolic Execution", 1975, ACM; [retrieved on Jan. 19, 2012]; Retrieved from Internet <URL: http://dl.acm.org/citation.cfm?id=808445>; pp. 234-345.*

Rusu, et al., "An Approach to Symbolic Test Generation", 2000 Springer-Verlag,[retrieved on Jan. 17, 2012]; Retrieved from Internet <URL: http://www.springerlink.com/content/cjm258516x64k824/>; pp. 338-357.*

Utting, et al., "A Taxonomy of Model-based Testing", 2006, Department of Computer Science, The University of Waikato, New Zealand, published online; [retrieved on Jan. 17, 2012]; Retrieved from Internet <URL:www1.cs.tum.edu/static/lehrstuhl/files/teaching/ws0708/ManagementSoftwareTesting/uow-cs-wp-2006-04.pdf>; pp. 1-16.*

Goel and Roychoudhury, "Synthesis and Traceability of Scenario-based Executable Models", 2007 IEEE; <retrieved on Jan. 18, 2012>; Retrieved from Internet <URL:http://ieeexplore.ieee.org/stamp/stamp.jsp?tp=&arnumber=4463735>; pp. 347-354.*

Dillon, et al., "An experience with Two Symbolic Execution-Based Approaches to Formal Verificaiton of Ada Tasking Programs", 1988 IEEE; <retrieved on Sep. 7, 2012>; Retrieved from Internet<URL:http://ieeexplore.ieee.org/stamp/stamp.jsp?tp=&arnumber=5363>;pp. 114-122.*

Hierons, et al., "Using Formal Specifications to Support Testing", 2009, ACM Computing Surveys;<retrieved on Sep. 7, 2012>; Retrieved from Internet<URL: http://dl.acm.org/citation.cfm?id=1459352>;pp. 9:1-9:76.*

Shankar, "Automated Deduction for Verification", 2009, ACM Computing Surveys: <retrieved on Sep. 7, 2012>; Retrieved from Internet <URL:http://dl.acm.org/ft_gateway.cfm?id=159437>;pp. 20:1-20:56.*

Zhou, et al., "Model-driven Automatic Generation of Verified BPEL code for Web Service Composition", 2009 IEEE; <retrieved on Sep. 7, 2012>; Retrieved from Internet<URL:http://ieeexplore.ieee.org/stamp/stamp.jsp?tp=&arnumber=5358748>;pp. 355-362.*

U.S. Appl. No. 11/866,043, filed Oct. 2, 2007, Rajan et al.

U.S. Appl. No. 12/046,736, filed Mar. 12, 2008, Prasad et al.

\* cited by examiner

US 8,359,576 B2

USING SYMBOLIC EXECUTION TO CHECK GLOBAL TEMPORAL REQUIREMENTS IN AN APPLICATION

TECHNICAL FIELD

The present disclosure relates generally to testing software.

BACKGROUND

To validate an application (such as, for example, a web application) a user may manually write test cases for the application, execute the application under the test cases, and check for violations of properties that should hold true under the test cases. To check for violations, the user may use external monitors that automatically check whether the properties are true at predetermined times during execution of the application or use inline assertions added to the source code of the application that return results at predetermined times during execution of the application indicating whether the properties are true. Such validation is substantially ad hoc, manual, and resource intensive and provides relatively limited coverage of potential bugs, especially corner-case bugs.

DESCRIPTION OF EXAMPLE EMBODIMENTS

Figure 1:
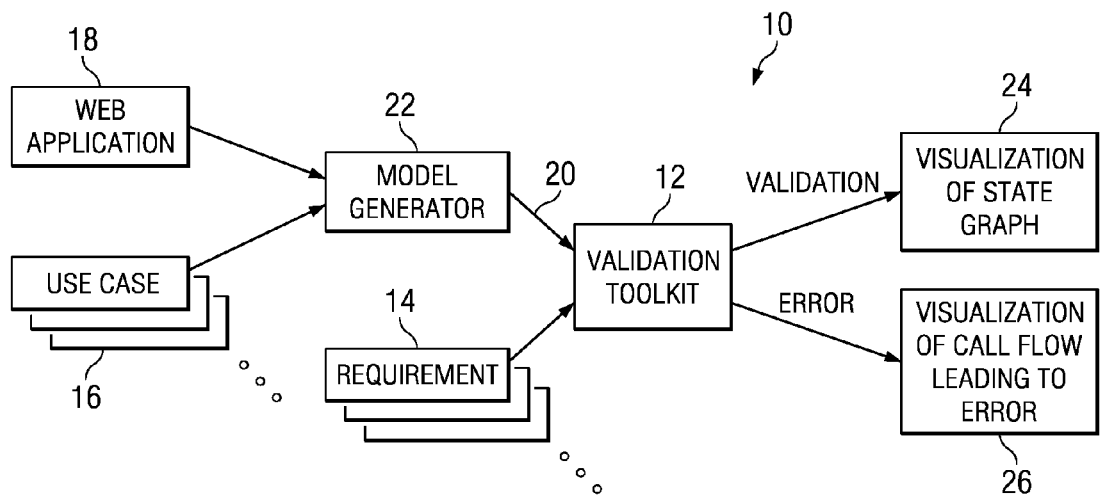
FIG. 1 illustrates an example environment of a validation toolkit.

FIG. 1 illustrates an example environment 10 of a validation toolkit 12. In particular embodiments validation toolkit 12 facilitates the validation of software, testing whether the software satisfies one or more requirements 14 when carrying out one or more use cases 16 and outputting the results of such testing. Reference to software may encompass an application (such as a web application 18) or a program, and vice versa, where appropriate. A requirement 14 of an application may be particular behavior of the application that must occur or a particular property that must hold true during execution of the application. Reference to behavior or a property may encompass a requirement 14, and vice versa, where appropriate. A use case 16 for a web application 18 may be a representation of a scenario that web application 18 may encounter when a user uses web application 18, such as for example a series of particular inputs from the user received by web application 18 in a particular sequence. In particular embodiments, a use case is a scenario that the business logic of web application 18 may respond to, as described below. Reference to a scenario may encompass a use case, and vice versa, where appropriate.

A user of validation toolkit 12 may specify one or more use cases 16 for web application 18 and communicate them to model generator 22 as input. Model generator 18 may access the source code of web application 18 as additional input. Model generator 18 may process the source code and combine the result with use cases 16 specified by the user to generate a consolidated application model 20 that a model checker in validation toolkit 12 may check, as described below. Application model 20 may be implemented in JAVA or another suitable programming language, according to particular needs. To process the source code, model generator 18 may copy the business logic (which may be implemented in JAVA) of the source code. Model generator 18 may model simplistically in JAVA or replace with empty stubs other components (such as for example Hypertext Markup Language (HTML) components) of the source code. As generated by model generator 18, application model 20 may include the business logic of the source code of web application 18 and JAVA models or empty stubs representing other components of the source code of web application 18. Reference to web application 18 may encompass application model 20, and vice versa, where appropriate. Where appropriate, the present disclosure contemplates any suitable programming language for business logic and is not limited to JAVA. Reference to business logic may encompass one or more functional algorithms that facilitate or enable the exchange of information between one or more databases and one or more user interfaces (UIs) where appropriate. Business logic may include one or more business rules (which may describe or express business policies concerning channels, locations, logistics, prices, and products) and one or more workflows (which may describe or express ordered tasks for passing information from one entity (which may be a person or a computer system) to another). As an example and not by way of limitation, business logic of a web application for an online retailer may include code residing at a back-end server that responds when a user attempts to add an item to an online shopping cart by checking inventory and determining whether the user can purchase the item. In addition or as an alternative, when a user removes an item from an online shopping cart, code representing business logic may update the inventory status of the item to reflect its availability. In addition or as an alternative, when a user purchases an item in an online shopping cart, code representing business logic may generate an invoice for the user, generate an order to a warehouse or factory for the item, and set up shipping for the item to the user. In particular embodiments, in a multilayered software architecture, business logic resides in a logic layer between a presentation layer and a data layer. The presentation layer may be a top layer providing a UI, which may translate input or output to or from a user. The logic layer may process instructions, make decisions, and perform calculations, as well as communicate data between the presentation layer and the data layer. The data layer may store and retrieve data for the logic layer or the presentation layer.

Validation toolkit 12 may receive as input application model 20 from model generator 22 and one or more requirements 14 specified by the user of validation toolkit 12. Validation toolkit 12 may analyze application model 20 to determine whether web application 18 satisfies one or more requirements 14 under use cases 16 specified by the user. If web application 18 satisfies requirements 14 under use cases 16 (or no violations of the properties being tested occur) then validation toolkit 12 may communicate to the user an indication that web application 18 has validated, along with a visualization 24 of a state graph of web application 18. If web application 18 does not satisfy one or more requirements 14 under one or more use cases 16 (or one or more violations of the properties being tested occur) then validation toolkit 12 may communicate to the user an indicate that validation toolkit 12 has found one or more errors in web application 18, along with a visualization 26 of one or more call flows leading to the one or more errors.

In particular embodiments, validation toolkit 12 may apply the formal validation technique of model checking to web applications to provide more comprehensive scenario/bug coverage as well as checking of more global requirements. Moreover, validation toolkit 12 may provide an intuitive template-based mechanism for users to specify global and sophisticated requirements, as well as support middleware for automatically generating requirement monitors. These monitors may execute in conjunction with the model checker to validate specified requirements. Furthermore, validation toolkit 12 may apply a validation technique based on symbolic execution that may check properties over substantially all possible user scenarios and substantially all possible user-input data values. The properties being checked need not be specified as inline assertions in the application code for validation based on symbolic execution. Particular embodiments combine these advantages into a validation solution that has the ease of use and expressiveness of the template-based requirement-capture middleware and the validation capabilities of model checking based on symbolic execution. Particular embodiments augment a framework for validating web applications by tightly integrating symbolic execution with template-based requirement specification and automatic monitor generation. Particular embodiments extend and generalize template-based specification and automatic monitor generation to facilitate interworking with symbolic execution. In particular embodiments, requirements validation middleware works with explicit-state model checking, model checking based on symbolic execution, or both. Particular embodiments may use symbolic execution to validate properties specified as inline code assertions, properties specified using an intuitive template-based mechanism, or both. In particular embodiments, to facilitate the use of symbolic execution in requirement validation, monitors generated by the requirements validation middleware are active, not only listening for events during a search of a state space, but also dynamically generating events in the search and influencing the structure of the state space. In particular embodiments, such monitoring may generate state-space branch and bound trees, according to particular needs.

Validation toolkit 12 may include one or more software components residing at one or more computer systems. Similarly, model generator 22 may include one or more software components residing at one or more computer systems. Software components of validation toolkit 12 and model generator 22 may be at one or more of the same computer systems. Requirements 14 and use cases 16 may be data provided by a user as input to validation toolkit 12 or model generator 22. Model generator 22 may access the source code of web application 18 from one or more web servers hosting web application 18 for Internet, World Wide Web, or other network users. Visualizations 24 and 26 may be data provided by validation toolkit 12 as output for visual presentation to a user of validation toolkit 12. One or more output devices of the computer systems running validation toolkit 12 may communicate visualization 24 and 26 to the user.

Figure 2:
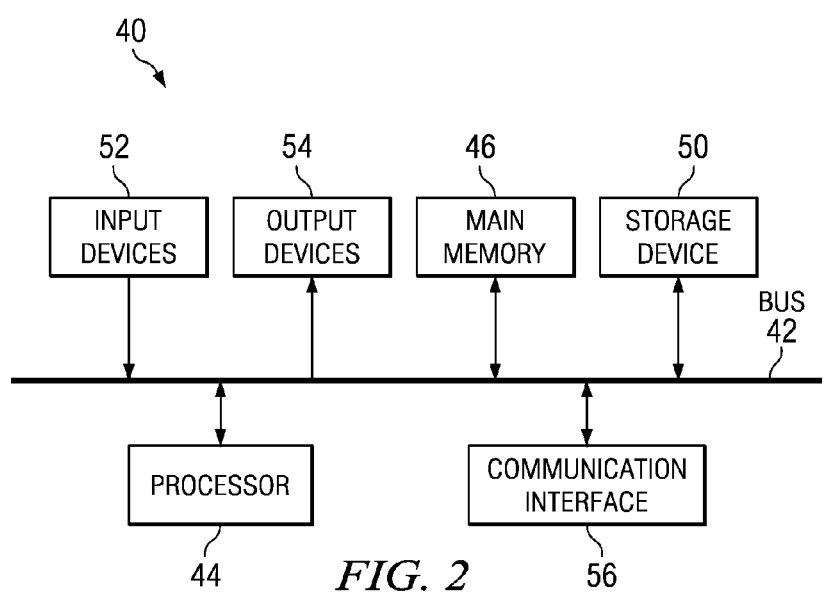
FIG. 2 illustrates an example architecture for an example computer system.

FIG. 2 illustrates an example architecture 40 for an example computer system. In particular embodiments, as described above, validation toolkit 12 and model generator 22 may be software components at one or more computer systems. Although FIG. 2 illustrates a particular architecture 40 for a particular computer system, the present disclosure contemplates any suitable architecture for any suitable computer system. Architecture 40 may include one or more buses 42, one or more processors 44, main memory 46, a mass storage device 50, one or more input devices 52, one or more output devices 54, and one or more communication interfaces 56. Bus 42 may include one or more conductors (such as for example copper traces in a printed circuit board (PCB)) providing electrical paths between or among components of the computer system enabling the components to communicate with each other. In addition or as an alternative, bus 42 may include one or more fibers providing optical paths between or among components of the computer system enabling the components to communication with each other. A motherboard and one or more daughterboards may provide one or more portions of bus 42. One or more peripheral buses for expansions to the motherboard or the daughterboards may provide one or more other portions of bus 42. The present disclosure encompasses any suitable bus 42.

Processor 44 may include any suitable processor or microprocessor for interpreting and executing instructions. As an example and not by way of limitation, processor 44 may include an integrated circuit (IC) containing a central processing unit (CPU) with one or more processing cores. Main memory 46 may include volatile or other memory directly accessible to processor 44 for storing instructions or data that processor 44 is currently executing or using. As an example and not by way of limitation, main memory 46 may include one or more ICs containing random access memory (RAM), such as dynamic RAM (DRAM) or static RAM (SRAM). Mass storage device 50 may include persistent memory for storing instructions or data for execution or use by processor 44. As an example and not by way of limitation, mass storage device 50 may include one or more hard disk drives (HDDs) for storing firmware, an operating system (OS), and software for applications that the OS may host for the computer system. Example applications that may run at the computer system include a web browser or a sniffer, which may analyze data packets received by the computer system. One or more of the HDDs may be magnetic or optical, according to particular needs. Mass storage device 50 may include one or more drives for removable optical or magnetic discs, such as compact disc read-only memory (CD-ROM).

Input devices 52 may include one or more devices enabling a user to provide input to the computer system. Example input devices 52 include a keyboard and a mouse. The present disclosure contemplates any suitable combination of any suitable input devices 52. Output devices 54 may include one or more devices for providing output to a user. Example output devices include a monitor, speakers, and a printer. The present disclosure contemplates any suitable combination of any suitable output devices 54. Communication interface 56 may include one or more components enabling the computer system to communicate with other computer systems. As an example and not by way of limitation, communication interface 56 may include one or more components for communicating with another computer system via network 12 or one or more links 22.

As an example and not by way of limitation, the computer system having architecture 40 may provide functionality as a result of processor 44 executing software embodied in one or more tangible, computer-readable media, such as main memory 46. A computer-readable medium may include one or more memory devices, according to particular needs. Main memory 46 may read the software from one or more other computer-readable media, such as mass storage device 50 or from one or more other sources via communication interface 56. The software may cause processor 44 to execute particular processes or particular steps of particular processes described herein. In addition or as an alternative, the computer system may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

Figure 3:
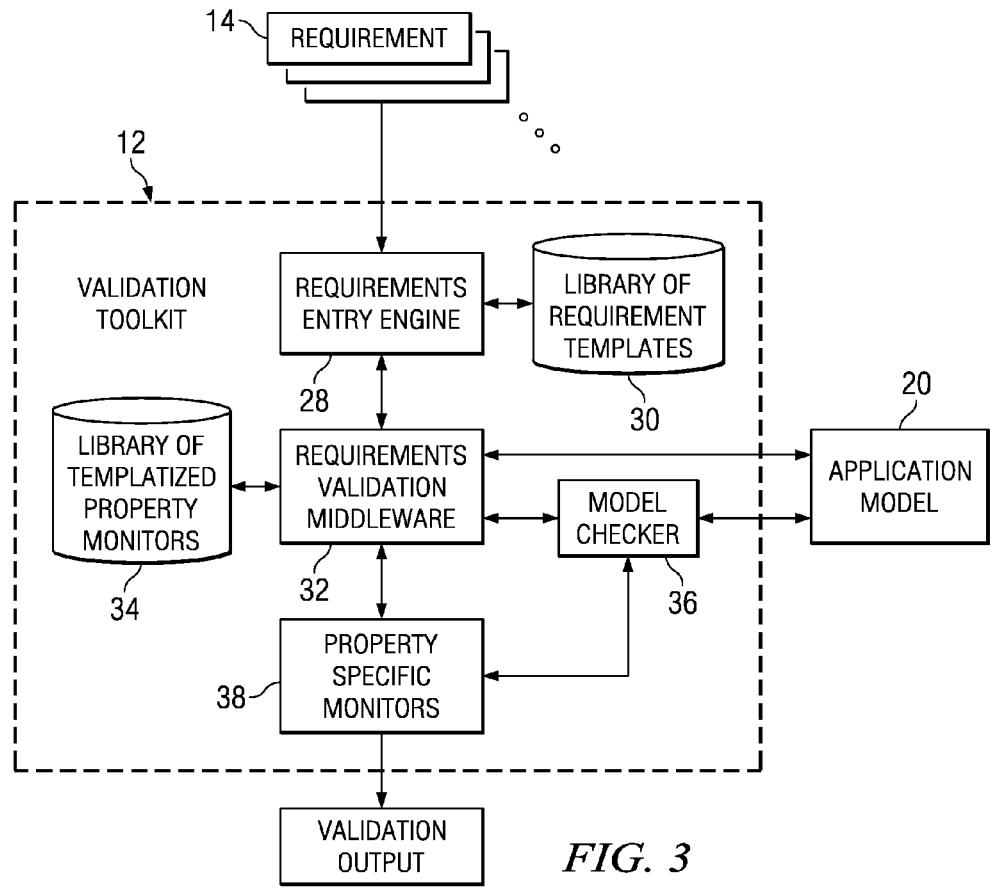
FIG. 3 illustrates an example validation toolkit.

FIG. 3 illustrates an example validation toolkit 12 that uses requirement templates for requirement capture and validation. In particular embodiments validation toolkit 12 includes a requirements entry engine 28, a library of requirement templates 30, requirements validation middleware 32, a library of property monitors 34, a model checker 36, and property-specific monitors 38. One or more components of validation toolkit 12 (such as, for example, requirements entry engine 28, requirements validation middleware 32, model checker 36, and property-specific monitors 38) may be dedicated software components providing specific functionality to validation toolkit 12. One or more components (such as, for example libraries 30 and 34) may be data embedded in validation toolkit 12 or stored apart from but accessible to validation toolkit 12. One or more components of validation toolkit 12 may be internal or external to validation toolkit 12, according to particular needs.

In particular embodiments, model checker 36 is an explicit-state software model checker for JAVA bytecode. As an example and not by way of limitation, model checker 36 may include JAVA PATHFINDER, which is a verification and testing environment for JAVA that integrates model checking, program analysis, and testing. JAVA PATHFINDER includes a JAVA virtual machine (VM) that interprets bytecode combined with a search interface enabling analysis of the complete behavior of a JAVA program, including interleavings of concurrent programs. JAVA PATHFINDER is implemented in JAVA. Where appropriate, the present disclosure contemplates any suitable model checker 36 implemented in any suitable programming language and is not limited to an explicit-state software model checker or JAVA PATHFINDER. Model checker 36 may access and operate on application model 20 of web application 18 as instructed by one or more other components of validation toolkit 12.

Requirements entry engine 28 may receive a requirement 14 (which may be a global temporal requirement 14) input by a user in a natural language (such as, for example, English) and translate the natural-language expression of requirement 14 to a mathematically formal expression comprehensible to model checker 36. Such mathematical formalism may be difficult to for web designers or software developers to learn or use. A library of requirement templates 30 may facilitate the informal expression of requirement 14 and its translation. Library 30 may include templates of common requirements 14 for validation, making the specification of requirements 14 simpler and more intuitive for the user. In particular embodiments, a requirement is temporal if it relates to the behavior of the application, over one or more points in time, relative to the execution of the application. As an example and not by way of limitation, the following is a temporal requirement: "If A is true at time X then B is will be true at time Y." The following is another example temporal requirement: "If A happens at time X then B will happen at time Y." The following is another example temporal requirement: "If an online shopper adds an item to an online shopping cart then the online shopping cart will include at least one item when the user navigates to a web page for purchasing items in the online shopping cart." In particular embodiments, a requirement is global if it relates to the behavior of an application as a whole without necessarily needing to designate one or more specific physical components of the application code where that behavior may occur.

A requirement template may be a backbone of a common requirement 14 that a user of validation toolkit 12 may assign particular properties to, according to particular needs. The user may select a requirement template for a requirement 14 that the user wants the model checker to validate and then customize the requirement template by assigning particular properties to it. As an example and not by way of limitation, the user may select a "response" template for specifying, "If A happens at time X then B will happen at time Y." To customize the response template, the user may specify the events A and B and the times X and Y to configure the requirement for validation. As another example, the user may select a "precedence" template for specifying, "If B happens at time Y then A will have happened at time X before time Y." The user may specify the events B and A and the times Y and X to configure the requirement for validation.

In particular embodiments, to express a requirement 14 using a requirement template, a user of validation toolkit 12 selects a requirement template and defines events in the requirement template as timed expressions that express particular data or control-flow behavior of web application 18 for validation. In particular embodiments, each requirement template is a temporal logic formula representing a common requirement pattern. Particular embodiments support the following temporal operators for requirement templates:

G: Globally
X: By the next state
F: Eventually or finally
P: Previously or before Particular embodiments support the following requirement templates for temporal requirements:

G(<E1>): Global safety
<E1> → F <E2>: Eventual response
<E1> → X <E2>: Immediate response
<E1> → P <E2>: Precedence <E1> and <E2> are events. G (<E1>) requires that the event <~E1> never occur during an execution trace. <E1>→F <E2> requires that, if event E1 occurs during a trace, event E2 occurs later in the trace. <E1>→X <E2> requires that, if event E1 occurs during a trace, event E2 occur after event E1 and before the next state in the trace. <E1>→P <E2> requires that, if event E1 occurs during a trace, event E2 has occurred earlier in the trace.

An event may be a Boolean timed expression, which may be a time-annotated arithmetical-logical expression that evaluates to true or false, where appropriate. In particular embodiments, the following syntax may apply to a timed expression:

```
timed-expression := field-expression @ method-call-event
    or
timed-expression := timed-expression1 op2 timed-expression2
``` op2 may be one of the following binary operators:

```
Arithmetic:       +, −, *, /
Relational:       <, >, ==, ≧, ≦, ≠
Logical:          &, |, →, ^
Container Access: for all, [ ], { }
```

In particular embodiments, a timed expression is an arithmetical-logical expression based on values of fields or objects in web application 18 and on literal values (or constants) connected using the operators above. Because the value or values of a field or object typically will change during execution of web application 18, each field or object in the expression may be annotated by a time point (called method-call events and defined below) relative to the execution of web application 18 that unambiguously specifies a precise value or set of values for evaluating the expression. A timed expression may evaluate to a single value or, if a container object such as an array, hash map, or set that is being evaluated, to a set of values. Moreover, the value or values may be Boolean, string, or numeric, i.e., floating point or integer.

In particular embodiments, the following syntax may apply to a field expression:

```
field-expression := field-expression1 op2 field-expression2
    or
field-expression := ~field-expression1
    or
field-expression := field/object/literal
``` op2 may be one of the following binary operators:

```
Arithmetic:       +, −, *, /
Relational:       <, >, ==, ≧, ≦, ≠
Logical:          &, |, →, ^
Container Access: for all, [ ], { }
```

In particular embodiments, a field expression is an untimed version of a timed expression. It may be a constant or a symbol referring to a field or an object in web application 18. As such, a field expression may be a string of symbols connected by operators and parentheses. To evaluate to a value or values in the context of the execution of web application 19, a field expression may be annotated with a method-call event to produce a timed expression.

In particular embodiments, a method-call event represents one or more specific time points in an execution trace of web application 18. A method-call event may be concrete enough to represent a single concrete time point or abstract enough to represent multiple. The following syntax may apply to a method-call event:

```
method-call-event := <method₁>(<param₁> = <value₁>)<invoke/return> @ <method₂>(<param₂> = <value₂>) @ . . . @ <method_{k−1}>(<param_{k−1}> = <value_{k−1}>)@<method_k>(<param_k> = <value_k>)
    or
method-call-event := weave-state
```

$<method_i>$ is a full name of a valid JAVA method called during execution of web application 18. $<param_i>$, which is optional, is a name of a parameter in an argument list of the valid JAVA method. $<value_i>$, which is optional, is an actual value taken by $<param_i>$ during the specific invocation or invocations of $<method_i>$. weave-state may produce a match at each state in a set of one or more points of interest in execution traces of web application 18. Particular embodiments may use these state points to enforce an abstract notion of time, such as in the requirement template $<E1> \rightarrow X <E2>$, as anchors for defining events of interest generally. In particular embodiments, these state points correspond to a user-specified set of salient method calls, e.g., relevant screen transitions in web application 18. In particular embodiments, these states correspond to state points of model checker 36.

Particular embodiments evaluate timed expressions and field expressions from left to right based on the following operator precedence, with operators on the same line having equal precedence:

| | |
|---|---|
| Container or object access operators | ., [ ], { } |
| Logical NOT | ~ |
| Arithmetic operators | /, * |
|  | +, − |
| Relational operators | <, >, ≧, ≦ |
|  | ==, ≠ |
| Logical operators | & |
|  | ^ (exclusive OR) |
|  | \| |
|  | → |
| Iterator (on containers) | for all |

The following specialized syntax may apply to the container or object access operators and the iterator:

1. . : <res> := <e1>.<e2>, <e1> is an object reference and <e2> is a data member of <e1>, <res>: returns a reference to or value of member field <e2>
2. [ ] : <res> := <e1>[<e2>], <e1>: An indexable container type such as arrays, array lists, etc., <e2>: int, <res>: the value stored at the index <e2> in the array <e1>)
3. { } : <res> := <e1>{<e2>}, <e1>: An content addressable container type such as a Java map, <e2>: string, <res>: the value stored against the key <e2> in the map <e1>
4. for all( ) : the following three variants are supported for this operator:
   a. for all(index, <container>) { <expression> }
   b. for all(key, <container>) { <expression> }
   c. for all(item, <container>) { <expression> }
   Syntax: <res> := for all(index/key/item, <container>) { <expression> } <res>, <expression>: Boolean; <container>: any container class with an iterator suitably defined in a library, e.g. map, array, list, array list; <index>: int; <key>: object, <item>: object.

In particular embodiments, the above syntax definitions refer to untimed expressions as operands, but the syntax is similar for timed expressions, where applicable. The remaining operators operate only on primitive types (such as numeric, string, and Boolean) and evaluate to the same types:

1. Arithmetic : <res> := <e1> +,-,*,/ <e2>, where <e1>, <e2>, <res>: numeric types
2. Relational : <res> := <e1> <,>,==,≤,≥,≠ <e2>, where <e1>, <e2>: numeric or string types and <res>: Boolean
3. Logical : <res> := <e1> &,|,→,^ <e2> OR <res> := ~<e1>, where <e1>, <e2>, <res>: Boolean type In particular embodiments, requirements validation middleware 35 receives requirements 14 from a user of validation toolkit 12 through requirements entry engine 28 and, using a library 34 of templatized property monitors, automatically generates property-specific monitors 38 for validating requirements 14. Each requirement template in library 30 may have a corresponding templatized property monitor in library 34. When the user has selected a requirement template and customized it to input a requirement 14, requirements validation middleware 32 may access a templatized property monitor in library 34 corresponding to the selected requirement template and generate a property-specific monitor 38 from the templatized property monitor based on the customization of the selected requirement template. Requirements validation middleware 32 may generate a property-specific monitor 38 for each requirement. Property-specific monitors 38 may be implemented in JAVA and may share one or more components with each other, as described below. The present disclosure contemplates property-specific monitors 38 being implemented in any suitable programming language. Property-specific monitors 38 may, but need not, be implemented in the same programming language as web application 18 or application model 20. In particular embodiments, requirements validation middleware 32 may coordinate the communication of data and events among the components of validation toolkit 12. As an example and not by way of limitation, for each requirement, requirements validation middleware may generate one or more property-specific monitors 38 using templatized monitors in library 34, communicate data and events from web application 18 or model checker 36 to property-specific monitors 38, and translate validation results from model checker 36 or property-specific monitors 38 for output to a user of validation toolkit 12.

When model checker 36 analyzes application model 20, property-specific monitors 38 may coexecute with model checker 36 and monitor the analysis for requirements 14 represented by concrete expressions, requirements 14 represented by symbolic expressions, or both. Requirements 14 (whether concrete or symbolic) monitored by property-specific monitors 38 may be global, temporal, or both.

Figure 4:
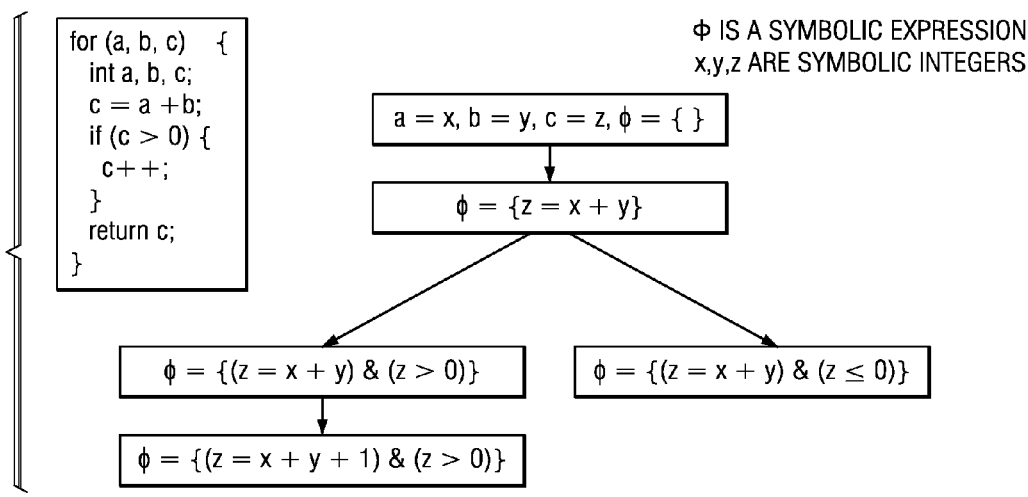
FIG. 4 illustrates example symbolic execution.

FIG. 4 illustrates example symbolic execution. In FIG. 4, each path in the tree represents a (possibly infinite) set of execution paths. To check the property if((a>1) & (b>0))→(c>2) using symbolic execution as FIG. 4 illustrates, the property may be negated (the negation being if((a>1) & (b>0))→(c<2)) and the negation may be checked at the end of each path of the symbolic execution. For the execution path ending with $\phi=\{(z=x+y) \& (z<0)\}$, an integer linear programming (ILP) solver or a solver using another suitable decision procedure may attempt to find a solution to the following first set of equations: x>1; y>0; z=x+y; z≦0; and z≦2. For the execution path ending with $\phi=\{(z=x+y+1) \& (z≦0)\}$, an ILP solver or a solver using another suitable decision procedure may attempt to find a solution to the following second set of equations: x>1; y>0; z=x+y+1; z≦0; and z≦2. In both sets of equations, the first two equations, x>1 and y>0, may be preconditions and the last equation, z≦2, may be a post condition. If no solution is found for the first or second set of equations, the property if((a>1) & (b>0))→(c>2) is true. If a solution is found for the first or second set of equations, the property is false and the solution is a counter example violating the property.

Figure 5:
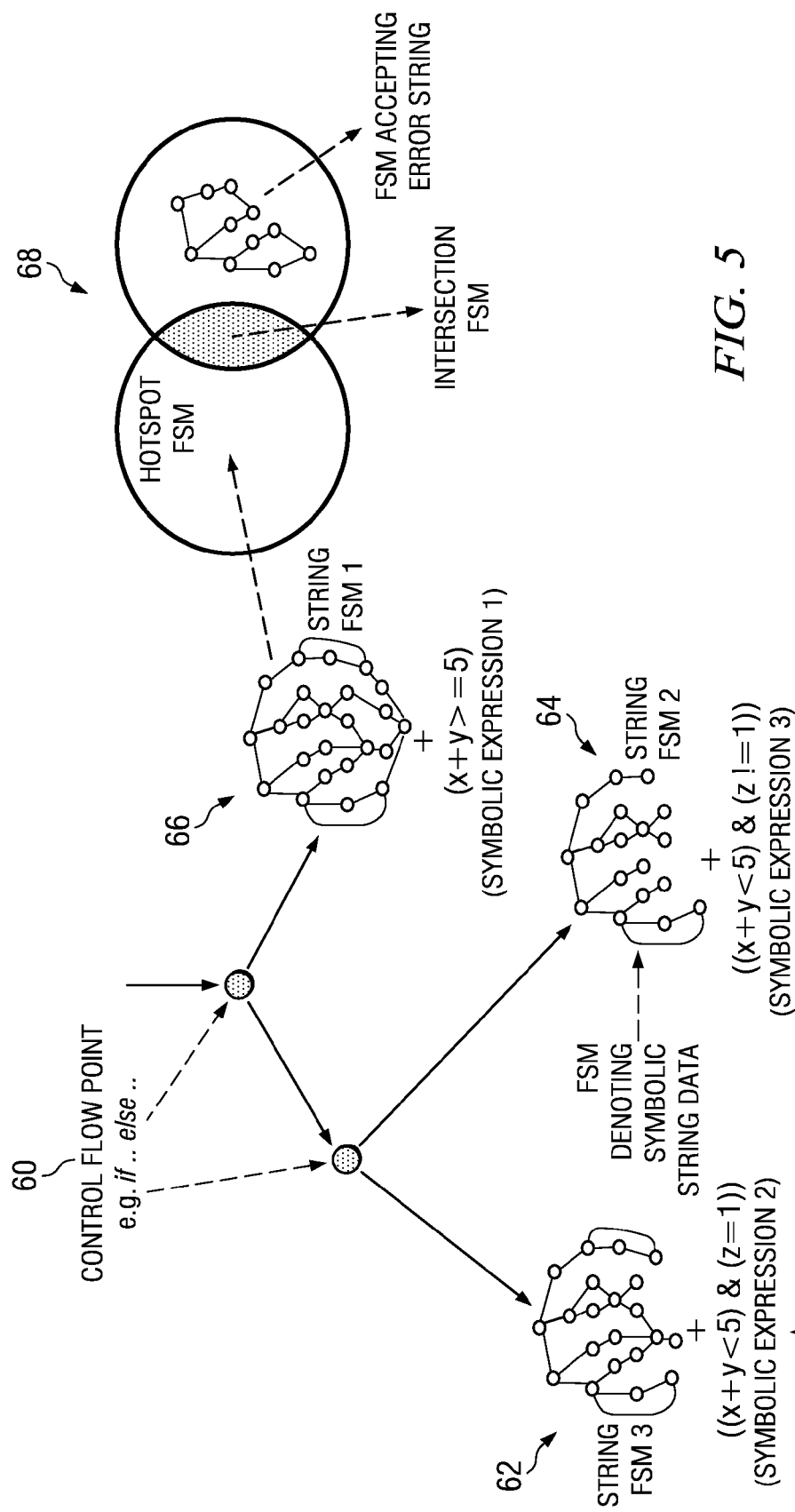
FIG. 5 illustrates example symbolic execution model checking.

FIG. 5 illustrates example symbolic execution model checking. A state-based model checker (such as model checker 36) may exhaustively execute the symbolic model along all feasible paths in the program model. At every control point 60 in the program (such as an "if" statement) the execution branches off into two different directions. Along each path, a nonstring symbolic equation may be maintained, along with a string finite state machine (FSM) representing the possible set of strings at that program point, as string FSMs 62 and 64 illustrate. At a program hotspot 66, where a requirement is to be checked, the string FSM intersects an FSM representing the set of error strings that should not occur at that point. This set of strings may be obtained from a requirement 14. The symbolic equation that encodes the program path that leads to the hotspot may be solved with a decision procedure solver. If the decision procedure solution is empty, it signifies a false or impossible path in the program. If intersection FSM 68 is empty, error strings are not possible at the hotspot. In either case, the requirement is validated. However, if the decision procedure returns a solution (signifying a true path) and intersection FSM 68 is nonempty, error strings are possible at the hotspot and a bug is found. This solution may be mapped back to the application program and traced all the way up to the driver inputs to create an error trace and a test case that catches the bug. This test case generation may be fully automated, thereby reducing manual verification time. Such a test case may be missed if test cases are manually generated.

In particular embodiments, the formal verification engine used in the software validation framework is a state-based model checker. The checker requires nondeterministic user inputs in the drivers. These model checkers cannot reason on a complete input space, for example, in a case of the whole range of integers, strings, etc., but can evaluate possible scenarios that are specified in the drivers. In a case of symbolic execution, the model checking is stateless and it treats all inputs to a program as symbols, thereby covering a complete input space. Symbolic execution may handle primitive data, such as integers and Booleans in a JAVA program. In the case of web applications, most of the inputs and primitive types are strings. Hence, it is necessary to model strings in the symbolic execution algebra.

Particular embodiments provide an architecture facilitating a methodology that substantially obviates the creation of user inputs in drivers. Moreover, unexpected errors or behaviors may be uncovered. Particular embodiments may reduce manual test-case generation by automatically generating interesting test cases based on requirements 14. Particular embodiments may validate requirements 14 based on substantially better program path and input coverage. This may be impossible using traditional testing methods, but may be important in cases like security validation.

Figure 6:
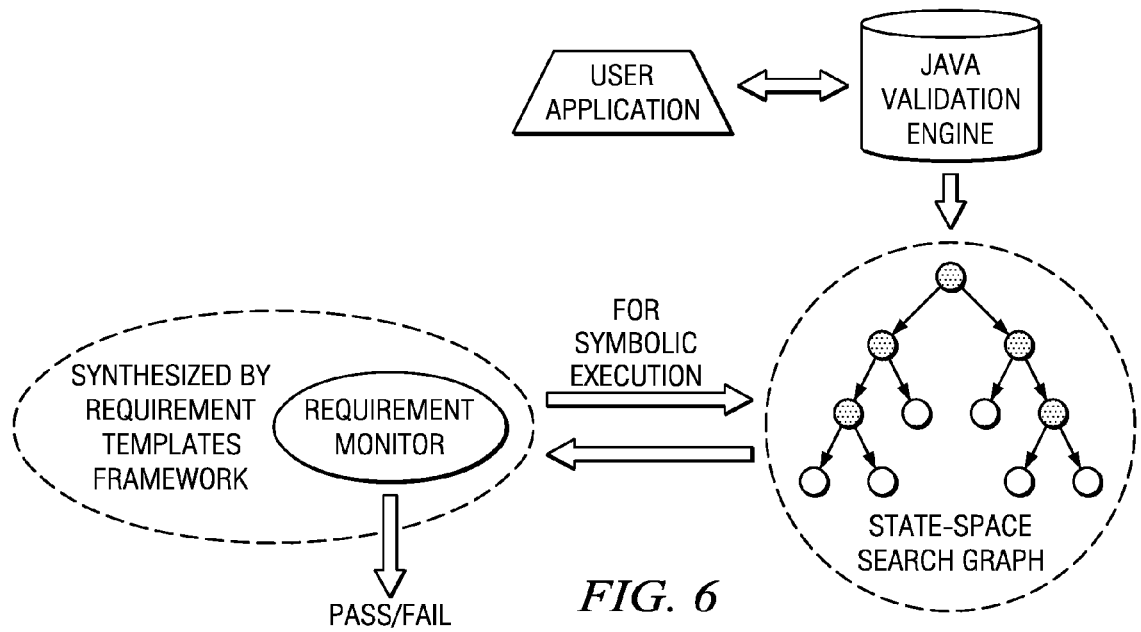
FIG. 6 illustrates a generalized environment of a symbolic requirement template framework.

Particular embodiments use symbolic requirement templates to combine the ease of use and the expressiveness of requirement templates with the validation capabilities of symbolic execution. FIG. 6 illustrates a generalized environment of a symbolic requirement template framework. When nonsymbolic requirement templates are used to specify requirements for validation, property-specific monitors 38 are passive observers, e.g., merely observing the search space by model checker 36. In contrast, when symbolic requirement templates are used to specify requirements for validation, property-specific monitors 38 should be active observers, e.g., detecting events during the state-space search by model checker 36 and communicating them back to model checker 36 to modify the state-space graph and hence its exploration.

Figure 7:
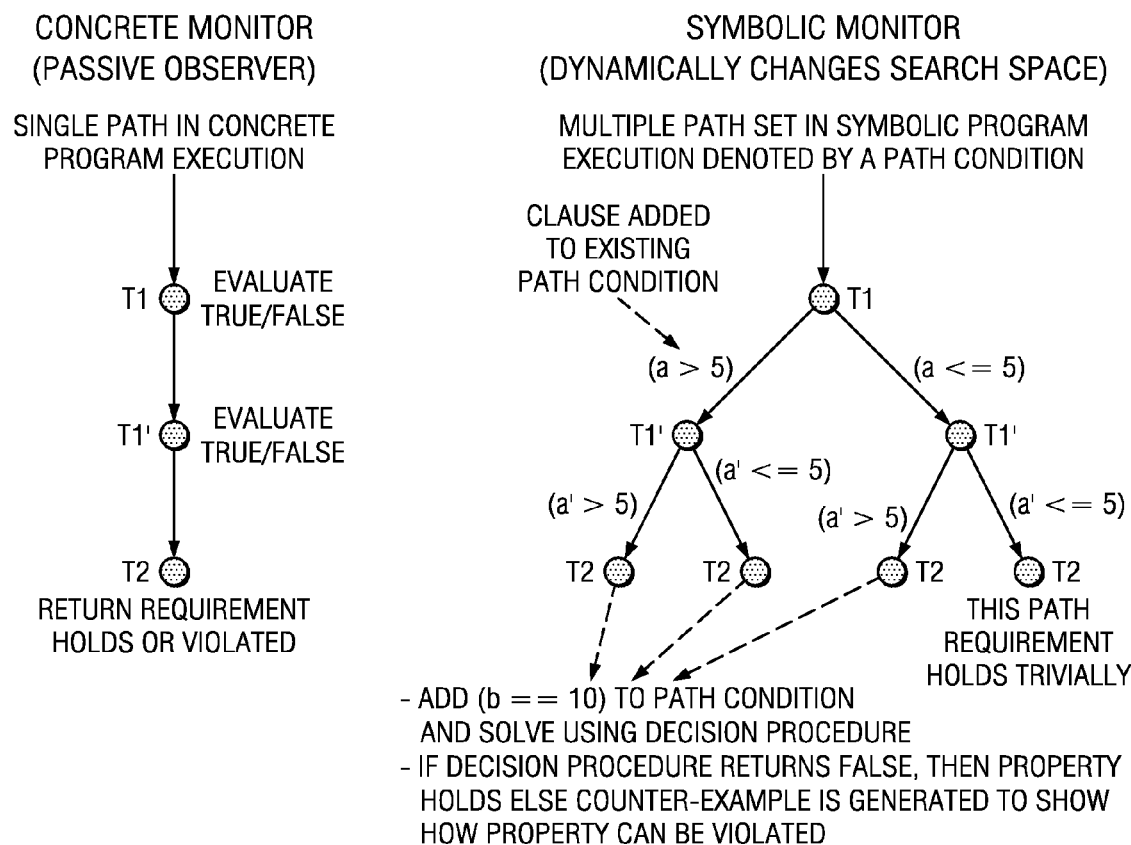
FIG. 7 illustrates example dynamic monitoring for symbolic execution model checking.

FIG. 7 illustrates an example of the dynamic monitoring technique for symbolic requirement templates during symbolic execution. Requirement 14 being monitored in FIG. 7 is if(a>5)@$T_1$→(b=10)@$T_2$. Requirement 14 is an example response property, with a and b being symbolic variables and $T_1$ and $T_2$ being specific time points in the program. As stated in FIG. 4, it is the negation of the actual requirement. Time point $T_1'$ arises when the temporal clause specified in $T_1$ is evaluated to true at a later time along a program path. It is common to encounter a clause specifying a time point multiple times along a single program path. In case of concrete execution, the requirement template framework will evaluate the clause (a>5) at time points $T_1$ and $T_1'$ to either true or false and appropriately update the monitor finite-state machine (FSM) to its appropriate state. When $T_2$ is encountered similar concrete evaluation is done and the monitor FSM is set to the appropriate error state or valid state which shows whether the global temporal requirement holds or is violated along that particular path.

The situation is different in case of a symbolic requirement. In such a scenario when time point $T_1$ is encountered, a concrete evaluation is not possible as the variable a in (a>5) is symbolic. Hence, the symbolic clause (a>5) is added to the path condition which assumes true for the condition at that point and the clause (a<=5) is added to the other side of the branch which assumes the condition to be false. The requirement template framework needs to notify the model checker regarding the insertions of such branch point in the state space search tree. Similar actions are taken at time point $T_1'$ leading to one more branch in the search tree. At the time point $T_2$ the path condition is evaluated using a suitable decision procedure solver along with the symbolic expression that signifies the clause (b=10). If the path condition is false then it signifies a false path. Thus the negation of the requirement is false along that path and the requirement is trivially true along that path. If the path condition is true then the requirement is violated and the decision procedure calculates a counterexample comprising of values to be specified on input variables that leads to the violation of the requirement.

Figure 8:
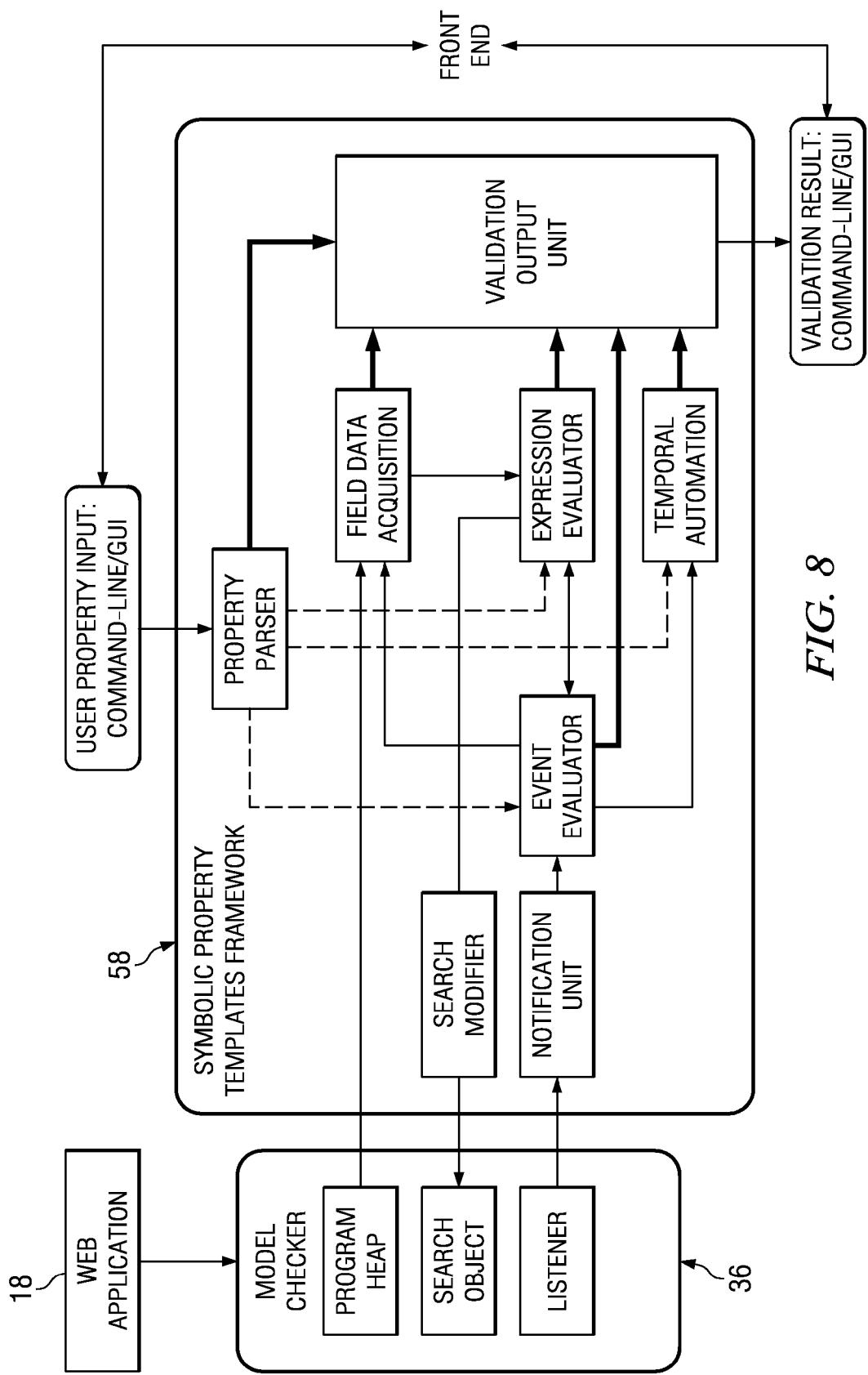
FIG. 8 illustrates an example architecture for symbolic execution model checking with requirements specified using requirement templates.

FIG. 8 illustrates an example architecture for symbolic model checking with requirements specified using requirement templates. Symbolic property templates framework 58 denotes a symbolic property templates framework. It is an architectural realization of the combination of components 28, 30, 32, 34, and 38 shown in FIG. 3. The present disclosure contemplates any suitable symbolic property templates framework. The present disclosure contemplates symbolic property template framework 58 including any suitable components, according to particular needs. In FIG. 8, model checker 36 may include one or more program heaps, one or more search objects, and one or more listeners. A listener may be an agent of symbolic property templates framework 58 that monitors a state-space search by model checker 36 for particular events and notifies symbolic property templates framework 58 when they occur. By way of example and not by way of limitation, such events may be function calls or assignments of values to data objects in web application 18. The search object may be an agent that manages and controls the overall structure of a search graph generated by model checker 36 as a consequence of model checking a web application 18 under use cases 16 as well as possibly in response to instructions from the search modifier in symbolic property templates framework 58.

Symbolic property templates framework 58 includes a property parser, a notification unit, an event evaluator, an expression evaluator, a search modifier, temporal automata, a field data acquisition unit, and a validation output unit. The front end may include a command-line graphical user interface (GUI) enabling a user of validation toolkit 12 to enter requirements 14 for validation and view or otherwise access the results of the validation. The property parser may check a structure of a requirement 14 entered by the user and, according to the structure, instantiate temporal automata, add variables and events to the notification unit for monitoring, add expressions to the expression evaluator, and add events to the event evaluator, as appropriate. The event evaluator may determine whether an event of interest has occurred in the execution of web application 18 and whether various application data fields or objects should be sampled. The expression evaluator may evaluate expressions that may be part of properties being validated, such as, for example, a>5. The expression evaluator may encompass all the expressions being monitored by symbolic property templates framework 58. In particular embodiments, the expression evaluator may operate on concrete values, on expressions, or both. In particular embodiments, the expression evaluator uses a decision procedure such as an ILP solver to operate on expressions. Field data acquisition may access a value of an object a for the expression evaluator at one or more appropriate times, as determined by the event evaluator.

A temporal automaton may be a physically instantiated object that supports the monitoring of a temporal property by observing meta events and determining whether a relevant property is true. A temporal automaton may record values of objects in the state space being searched by model checker 36 to determine whether a certain property relationship exists at a future point in time based on a later event of interest. There may be a temporal automaton for each temporal property being validated. Information may be fed back to model checker 36 through the search modifier. The expression evaluator may notify the search modifier when a point of interest has occurred with respect to a particular property so the search modifier will modify the search being done by model checker 36 according to the property being validated. As an example and not by way of limitation, the search modifier may instruct model checker 36 to split or branch the search whenever, as in the case of the dynamic monitoring in FIG. 7, there is the possibility of T1 or T2 occurring. In particular embodiments, the search modifier may put branch points into the program when an event of interest with respect to a property being checked occurs. The search modifier may instruct the search object in model checker 36 how to modify the tree. In particular embodiments, there is no physical property specific monitor 38: property-specific monitors 38 are functionally realized, collectively, by various components of symbolic property templates framework 58. In particular embodiments, model checker 36 runs web application 18 only once, for each use case and together with symbolic property templates framework 58, checks simultaneously all properties being validated. As model checker 36 executes, symbolic property templates framework 58 may mine all the expressions, all the variables, and all the time points of interest to simultaneously check all the properties being validated.

Figure 9:
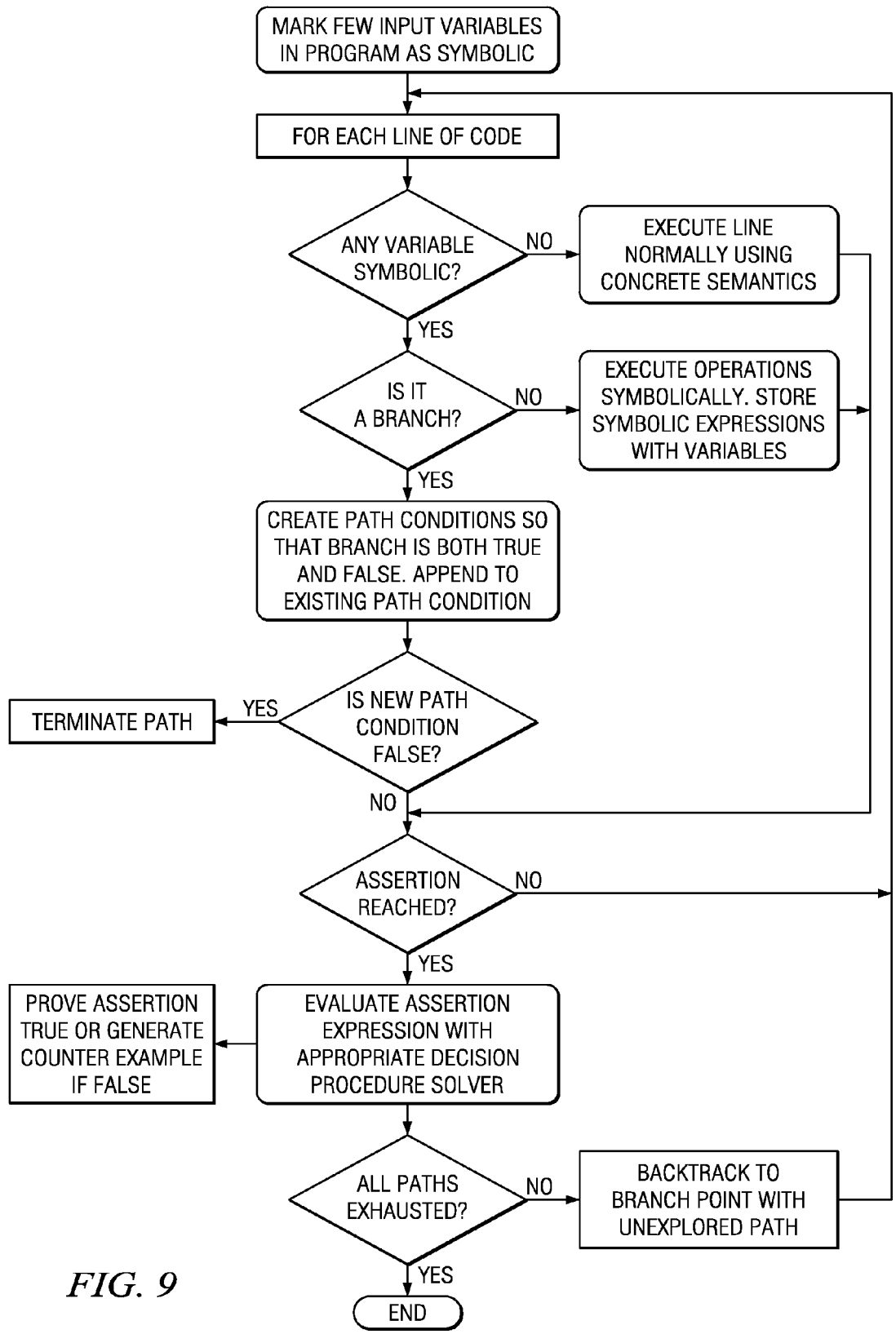
FIG. 9 illustrates an example method for symbolic execution model checking with requirements expressed as inline assertions.
Figure 10:
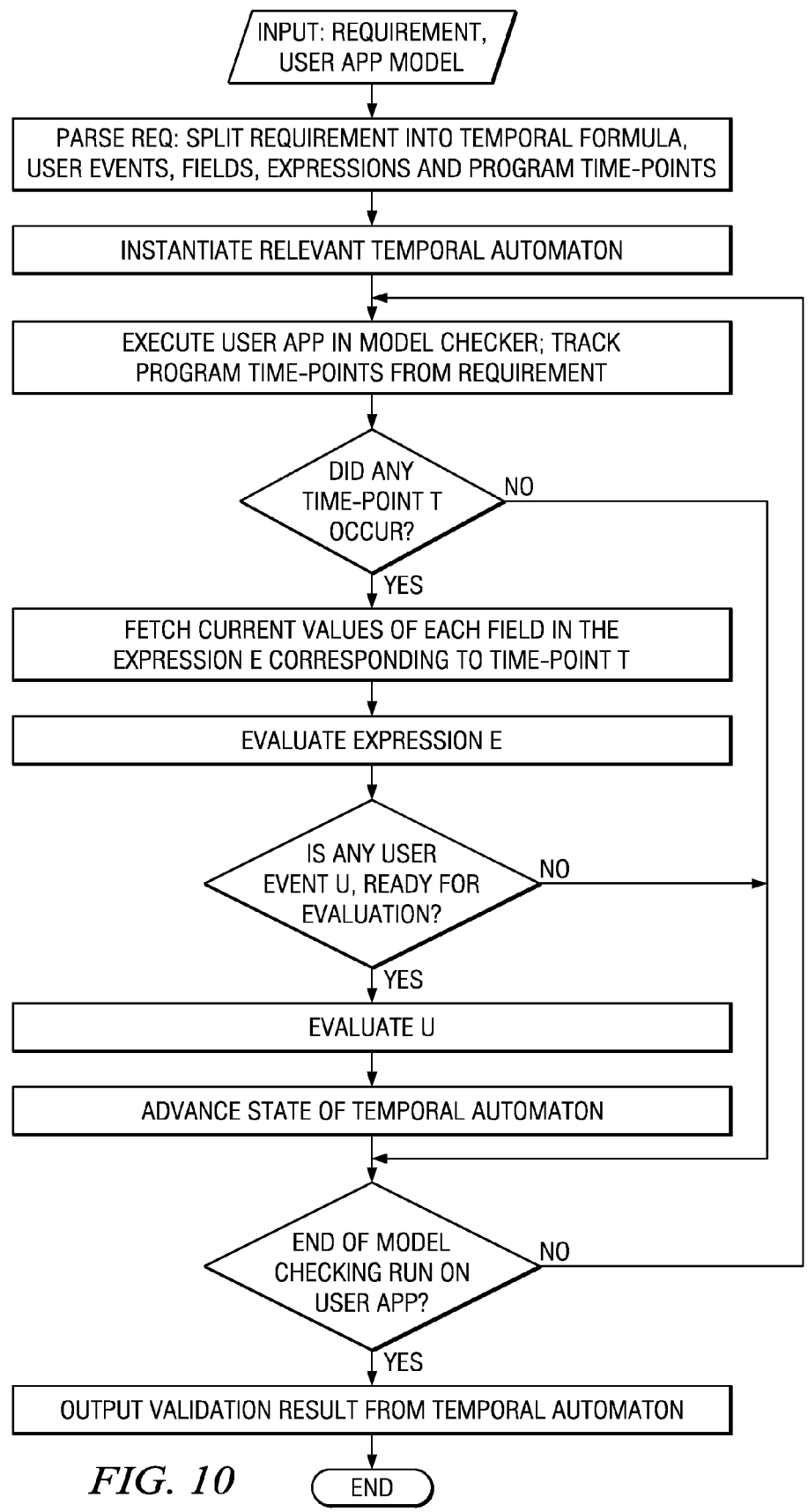
FIG. 10 illustrates an example method for nonsymbolic (or concrete) execution model checking with requirements specified using requirement templates.
Figure 11:
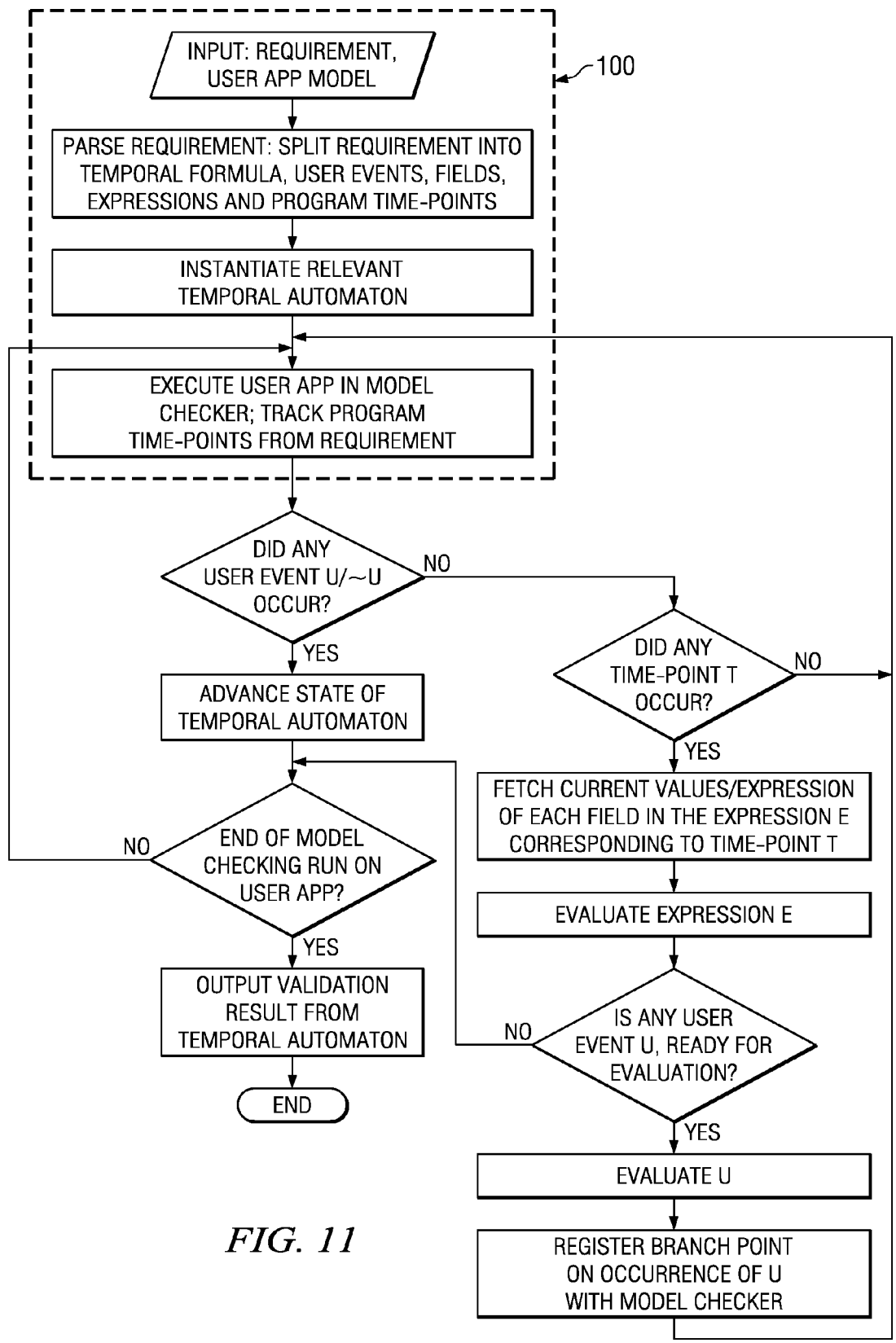
FIG. 11 illustrates an example method for symbolic execution model checking with requirements specified using requirement templates.
Figure 12:
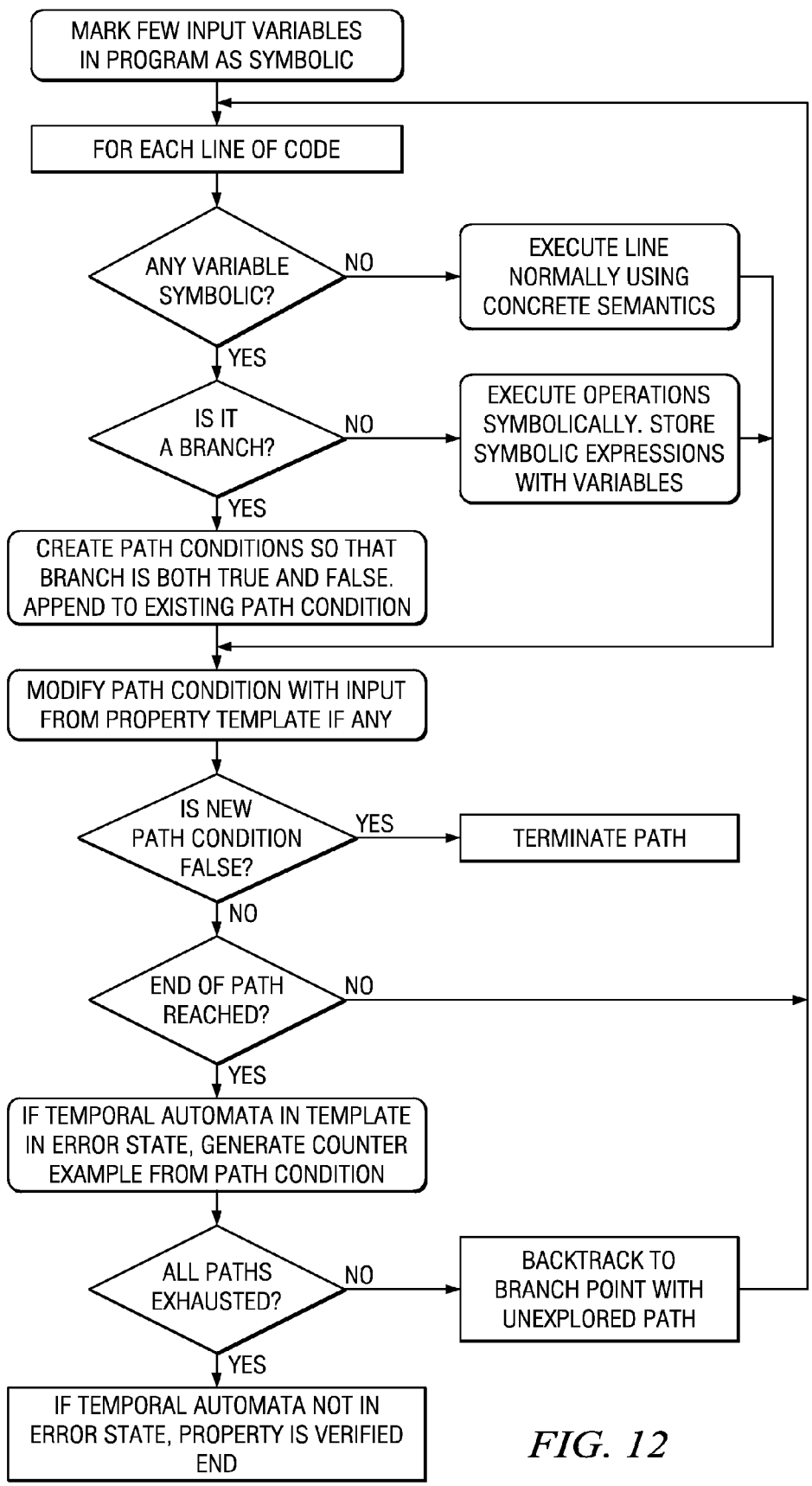
FIG. 12 illustrates an example method for dynamically monitoring a state-space search by a model checker.

FIG. 9 illustrates an example method for symbolic execution based model checking of software, with requirements expressed as inline code assertions. Specifically, it illustrates the steps followed by model checker 36 in performing the model checking symbolically rather then with concrete values. FIG. 10 illustrates an example method for nonsymbolic (or concrete) execution model checking with requirements specified using requirement templates. FIG. 11 illustrates an example method for symbolic execution model checking with requirements specified using requirement templates. It is essentially an extension and generalization of FIG. 10 to include embodiments of the present invention, i.e., the integration of symbolic execution as a means of model checking requirements with property templates as a means of specifying them. A key element of this generalization is the step where the occurrence of any user event, during the checking, is registered with the model checker, potentially to be used by the search modifier (FIG. 8) to modify the search. FIG. 12, which is an extension of FIG. 9 to encompass embodiments of the current invention, further illustrates the notion of search modification (FIG. 7 provides an example of search modification). This figure shows the modification of the core model checking algorithm to account for the fact that the property being checked is not available within the application, as an inline code assertion but is provided externally through the property templates mechanism. Although particular steps of these methods are illustrated and described as occurring in a particular order and being executed by particular components, the present disclosure contemplates any suitable steps of any of these methods occurring in any suitable order and being executed by any suitable components.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

We claim:

1. A method executed by at least one processor, comprising:
   accessing one or more global temporal requirements of an application specified using one or more requirement templates from a library of requirement templates, the application comprising business logic;
   accessing a model of the application, the model comprising the business logic of the application and one or more use cases for the application;
   generating one or more symbolic requirements from one or more variables in one or more of the global temporal requirements specified as symbolic variables;
   generating one or more symbolic expressions and one or more search path conditions for one or more variables in one or more of the global temporal requirements with values from symbolic inputs derived from one or more use cases for the application;
   searching a state space of the application model with a model checker, the search comprising constructing and analyzing a graph of the state space and creating and maintaining one or more symbolic expressions and one or more search paths during the search;
   monitoring the search of the state space for events in the state space encompassed by the symbolic requirements and modifying the construction of the graph of the state space to record potential occurrence of one or more events encompassed by the symbolic requirements;
   solving one or more symbolic expressions from one or more of the symbolic requirements at one or more ends of one or more search paths in the graph of the state space to determine whether one or more of the symbolic requirements are valid; and
   communicating whether one or more of the symbolic requirements are valid for presentation to a user.

2. The method of claim 1, wherein solving a symbolic expression comprises:
   negating the symbolic requirement;
   generating a set of equations for the symbolic variables along each search path of the graph of the state space;
   inserting one or more first branch points into the graph of the state space and keeping track of particular search path conditions along symbolic search paths in the graph of the state space associated with symbolic variables in branch conditions;
   inserting one or more second branch points into the graph of the state space for symbolic events;
   attempting to identify one or more solutions of the set of symbolic equations and search path conditions at an end of each search path of the graph of the state space, a solution indicating a violation of a global temporal requirement and comprising a counter example describing a failure causing the violation; and
   if identified, communicating one or more solutions for presentation to a user as one or more test cases violating the global temporal requirement.

3. The method of claim 1, wherein the application is a web application.

4. The method of claim 1, wherein the business logic of the application is implemented in JAVA.

5. The method of claim 1, wherein the model of the application is implemented in JAVA.

6. The method of claim 1, wherein the model checker comprises an explicit state JAVA model checker.

7. The method of claim 1, wherein solving the symbolic expressions comprises using a decision procedure comprising one or more of integer linear programming (ILP), Boolean satisfiability (SAT) solving, or string finite state machine (FSM) solving, to attempt to identifying solutions to equations derived from the symbolic expressions, search path conditions, and the graph of the state space.

8. The method of claim 1, further comprising:
   receiving from a user a selection of the one or more requirement templates in the library of requirement templates;
   receiving from the user assignments of properties to the requirement templates, the assignments being expressed in a natural language; and
   translating the assignments and the requirement templates to mathematically formal expressions comprehensible to the model checker, the translation generating the global temporal requirements of the application.

9. The method of claim 1, further comprising:
   accessing source code of the application;
   accessing the use cases for the application;
   copying the business logic of the application from the source code;
   generating one or more rudimentary models or empty stubs for one or more components of the application that are not business logic;
   combining the copied business logic with the rudimentary models or the empty stubs to generate the model of the application.

10. Software embodied in one or more non-transitory computer-readable tangible media and when executed operable to:
   access one or more global temporal requirements of an application specified using one or more requirement templates from a library of requirement templates, the application comprising business logic;
   access a model of the application, the model comprising the business logic of the application and one or more use cases for the application;

generate one or more symbolic requirements from one or more variables in one or more of the global temporal requirements specified as symbolic variables;

generate one or more symbolic expressions and one or more search path conditions for one or more variables in one or more of the global temporal requirements with values from symbolic inputs derived from one or more use cases for the application;

search a state space of the application model with a model checker, the search comprising constructing and analyzing a graph of the state space and creating and maintaining one or more symbolic expressions and one or more search paths during the search;

monitor the search of the state space for events in the state space encompassed by the symbolic requirements and modifying the construction of the graph of the state space to record potential occurrence of one or more events encompassed by the symbolic requirements;

solve one or more symbolic expressions from one or more of the symbolic requirements at one or more ends of one or more search paths in the graph of the state space to determine whether one or more of the symbolic requirements are valid; and communicate whether one or more of the symbolic requirements are valid for presentation to a user.

11. The software of claim 10, operable, to solve a symbolic expression, to:

negate the symbolic requirement;

generate a set of equations for the symbolic variables along each search path of the graph of the state space;

insert one or more first branch points into the graph of the state space and keeping track of particular search path conditions along symbolic search paths in the graph of the state space associated with symbolic variables in branch conditions;

insert one or more second branch points into the graph of the state space for symbolic events;

attempt to identify one or more solutions of the set of symbolic equations and search path conditions at an end of each search path of the graph of the state space, a solution indicating a violation of a global temporal requirement and comprising a counter example describing a failure causing the violation; and if identified, communicate one or more solutions for presentation to a user as one or more test cases violating the global temporal requirement.

12. The software of claim 10, wherein the application is a web application.

13. The software of claim 10, wherein the business logic of the application is implemented in JAVA.

14. The software of claim 10, wherein the model of the application is implemented in JAVA.

15. The software of claim 10, wherein the model checker comprises an explicit state JAVA model checker.

16. The software of claim 10, operable, to solve the symbolic expressions, to use a decision procedure comprising one or more of integer linear programming (ILP), Boolean satisfiability (SAT) solving, or string finite state machine (FSM) solving, to attempt to identifying solutions to equations derived from the symbolic expressions, search path conditions, and the graph of the state space.

17. The software of claim 10, further operable to:

receive from a user a selection of the one or more requirement templates in the library of requirement templates;

receive from the user assignments of properties to the requirement templates, the assignments being expressed in a natural language; and translate the assignments and the requirement templates to mathematically formal expressions comprehensible to the model checker, the translation generating the global temporal requirements of the application.

18. The software of claim 10, further operable to:

access source code of the application;

access the use cases for the application;

copy the business logic of the application from the source code;

generate one or more rudimentary models or empty stubs for one or more components of the application that are not business logic;

combine the copied business logic with the rudimentary models or the empty stubs to generate the model of the application.

19. A system comprising:

a processor;

a memory storing executable instructions for execution by the processor, the instructions further comprising:

means for accessing one or more global temporal requirements of an application specified using one or more requirement templates from a library of requirement templates, the application comprising business logic;

means for accessing a model of the application, the model comprising the business logic of the application and one or more use cases for the application;

means for generating one or more symbolic requirements from one or more variables in one or more of the global temporal requirements specified as symbolic variables;

means for generating one or more symbolic expressions and one or more search path conditions for one or more variables in one or more of the global temporal requirements with values from symbolic inputs derived from one or more use cases for the application;

means for searching a state space of the application model with a model checker, the search comprising constructing and analyzing a graph of the state space and creating and maintaining one or more symbolic expressions and one or more search paths during the search;

means for monitoring the search of the state space for events in the state space encompassed by the symbolic requirements and modifying the construction of the graph of the state space to record potential occurrence of one or more events encompassed by the symbolic requirements;

means for solving one or more symbolic expressions from one or more of the symbolic requirements at one or more ends of one or more search paths in the graph of the state space to determine whether one or more of the symbolic requirements are valid; and means for communicating whether one or more of the symbolic requirements are valid for presentation to a user.

* * * * *